United States Patent [19]

Rahnema

[11] Patent Number: 5,754,600
[45] Date of Patent: May 19, 1998

[54] METHOD AND APPARATUS FOR OPTIMUM SOFT-DECISION VITERBI DECODING OF CONVOLUTIONAL-DIFFERENTIAL ENCODED QPSK DATA IN COHERENT DETECTION

[75] Inventor: Moe Rahnema, Chandler, Ariz.

[73] Assignee: Motorola, Inc., Schaumburg, Ill.

[21] Appl. No.: 296,907

[22] Filed: Aug. 29, 1994

[51] Int. Cl.$^6$ .................................................. H03D 1/00
[52] U.S. Cl. ................................. 375/341; 371/43.7
[58] Field of Search ................................. 375/262, 265, 375/340, 341, 316; 341/76; 371/43, 44, 45, 43.6, 43.7, 43.8, 43.1

[56] References Cited

U.S. PATENT DOCUMENTS

| | | |
|---|---|---|
| 4,713,817 | 12/1987 | Wei . |
| 4,742,533 | 5/1988 | Weidner et al. . |
| 4,755,998 | 7/1988 | Gallager ............................. 375/262 X |
| 4,761,784 | 8/1988 | Srinivasagopalan et al. . |
| 4,941,154 | 7/1990 | Wei .................................... 375/262 X |
| 5,023,889 | 6/1991 | Divsalar et al. ...................... 375/265 |
| 5,054,036 | 10/1991 | Brownlie et al. ..................... 375/27 |
| 5,113,411 | 5/1992 | Yoshida et al. . |
| 5,113,412 | 5/1992 | Goldstein . |
| 5,144,644 | 9/1992 | Borth .................................... 375/341 |
| 5,185,763 | 2/1993 | Krishnan .............................. 375/262 |
| 5,233,629 | 8/1993 | Paik et al. . |
| 5,233,630 | 8/1993 | Wolf . |
| 5,396,518 | 3/1995 | How .................................... 375/265 |

OTHER PUBLICATIONS

Sakai et al, "Soft-decision Viterbi Decoding w/ Diversity Combining" Globecom '90 :IEEE Global Telecommunications Conf. 1990 pp. 1127-1131.

Primary Examiner—Tesfaldet Bocure
Assistant Examiner—Bryan Webster
Attorney, Agent, or Firm—Gregory J. Gorrie

[57] ABSTRACT

In a communication system, digital data is convolutionally encoded and then differentially encoded before being phase shift key (PSK) modulated for transmission. An optimum process for coherent demodulation and soft-decision decoding of the data is disclosed. The received bit sequence through a Viterbi decoder is replaced with a differentially encoded version of the sequence, and a metric is computed. The path having the best metric of all possible paths is selected. The technique may be used not only for quadrature phase shift key (QPSK) modulated data but in general for any M-ary phase shift modulation. Further, an immunity to phase ambiguities caused by cycle slips is provided in the transmission and reception of data on fading channels through the combined convolutional and differential encoding of data.

18 Claims, 5 Drawing Sheets

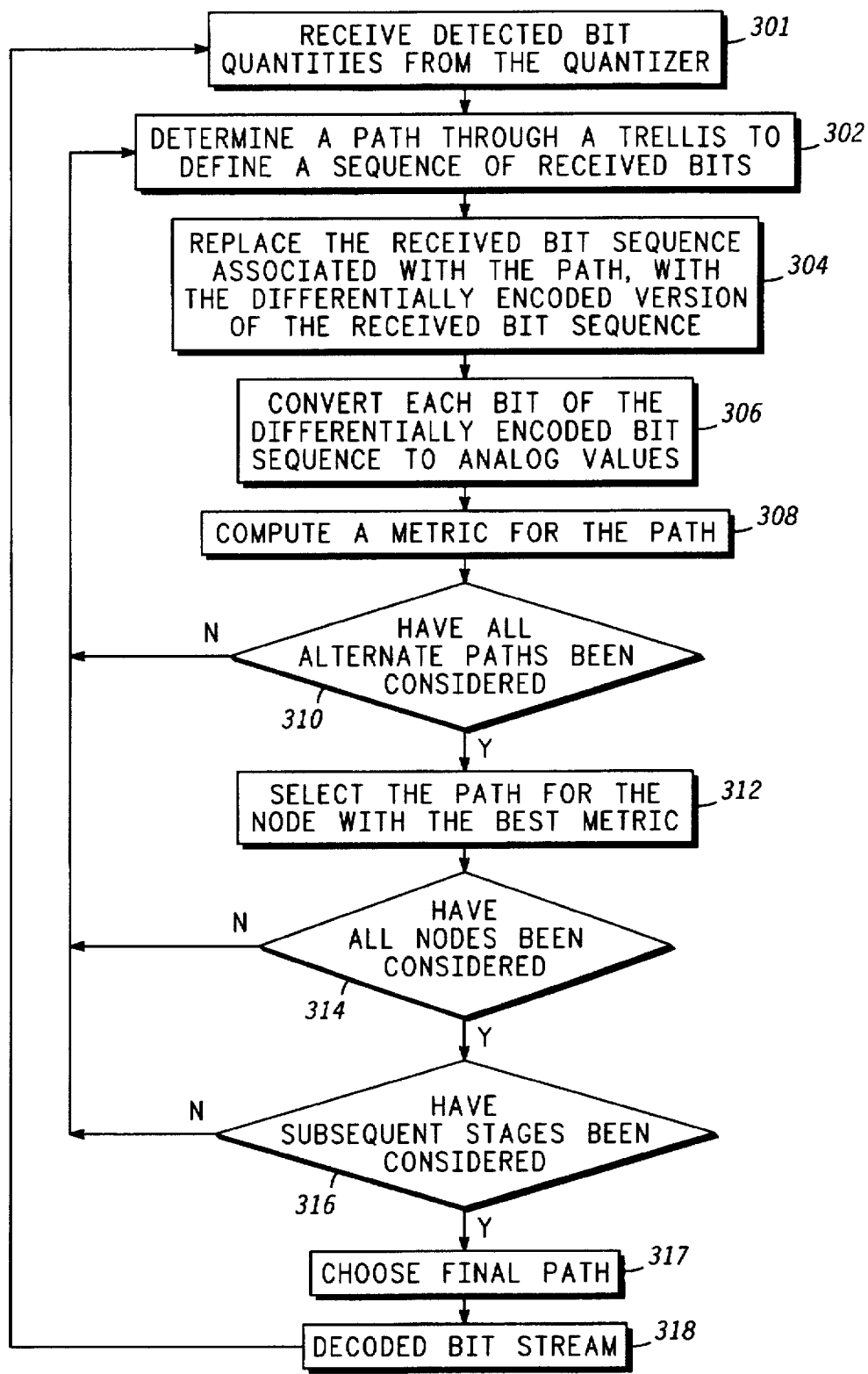
FIG. 8    300

METHOD AND APPARATUS FOR OPTIMUM SOFT-DECISION VITERBI DECODING OF CONVOLUTIONAL-DIFFERENTIAL ENCODED QPSK DATA IN COHERENT DETECTION

TECHNICAL FIELD OF THE INVENTION

The present invention relates generally to communication systems that transmit and receive QPSK data and that perform the coherent detection thereof. More specifically, the present invention relates to communication systems that convolutionally encode and differentially encode QPSK data.

BACKGROUND OF THE INVENTION

Communication systems generally use phase shift keying modulation (PSK) to provides improvement in error rate performance over differential phase shift keying modulation (DPSK) which provides for a simpler implementation of the demodulator. For example, the quadrature phase shift keying version, QPSK, (using 2 bits at a time to modulate the carrier) provides almost 2 dB improvement in performance over differential quadrature phase shift keying modulation over a considerable practical range of error rate performance. This is due to the fact that PSK modulation uses the recovered phase information at the receiver (and hence more information) for demodulation of the transmitted phase information (coherent demodulation), whereas DPSK recovers the transmitted data bits (which have been encoded differentially into phase information) by comparing the phases of the received signal over two consecutive symbol intervals (differentially coherent) through effectively a phase subtraction operation. This doubles the noise variance in the differential phase detection process causing a 2.3 dB performance loss over PSK (in the case of quadrature phase modulation). See John Proakis, "Digital Communications". McGraw-Hill Publications, 1983 for more information.

However, an important advantage of DPSK over QPSK in addition to the simplicity of implementing the demodulation process lies in its ability to resolve phase ambiguities which can result during the carrier recovery and demodulation processes at the receiver. In order to maintain the advantages of both PSK and DPSK, the data streams are differentially encoded (modulo 2 addition of consecutive symbols) at the transmitter and then phase shift-keyed (PSK) for transmission. The receiver uses coherent demodulation (a PSK demodulator) to demodulate the differentially encoded data bits. Differential decoding (modulo 2 addition again) is performed subsequent to the demodulation process to recover the original transmitted source data bits.

This differential encoding/decoding process helps resolve any phase ambiguities resulting in the coherent demodulating receiver Phase ambiguities of +/-180 degrees can occur in the demodulation process as a result of cycle slips caused by fading on radio channels. Rotational invariant convolutional codes are used to recover from cycle slips and eliminate the need for differential encoding. The recovery process, however, can take a considerable time and is more suited for continuous mode transmission. In burst mode transmission where the user transmits a limited amount of information (i.e., packets) in periodically recurring time slots, the use of rotationally invariant convolutional codes may not provide recovery from the phase ambiguities caused by cycle slips in time.

Differential encoding can complicate the proper application of soft-decision Viterbi decoding to the data that has been convolutionally encoded at the transmitter. Since soft-decision Viterbi decoding can in turn provide performance improvement of at least 2 dB over the impler hard-decision Viterbi decoding, it would be desirable to provide a method to resolve this complication.

According to Bogusch, R. L., "Digital Communications in Fading Channels: Tracking and Synchronization", Mission Research Corp., Arascadero, Calif., Report No. WL-TR-90, April 1990, and Bogusch, R. L., "Digital Communications in Fading Channels: Modulation and Coding", Mission Research Corp., Santa Barbara, Calif., Report No. MRC-R-1043, Mar. 11, 1987, a 5 dB improvement in performance on fading channels may be expected.

Thus what is needed are a method and apparatus for decoding convolutionally and differentially encoded data. What is also needed are a method and apparatus for providing improved phase tracking performance in QPSK systems. What is also needed is a method and apparatus with improved error performance on fading channels in burst mode transmission. What is also needed is improvement in performance in fading channels in a satellite communication system where the communication satellites are continually moving. What is also needed are a method and apparatus that provides immunity to phase ambiguities in burst mode transmission.

BRIEF DESCRIPTION OF THE DRAWINGS

FIG. 8 shows a flowchart of a procedure for decoding a received signal suitable for use in a preferred embodiment of the present invention.

DETAILED DESCRIPTION OF THE DRAWINGS

Phase ambiguities of +/-180 degrees can occur in the demodulation process as a result of cycle slips caused by fading on radio channels. Rotational invariant convolutional codes are used to recover from cycle slips and eliminate the need for differential encoding. The recovery process, however, can take a considerable time and is more suited for continuous mode transmission. In burst mode transmission where the user transmits a limited amount of information (i.e., packets) in periodically recurring time slots, the use of rotationally invariant convolutional codes may not provide recovery from the phase ambiguities caused by cycle slips in time. An alternative solution is provided that superimposes differential encoding on data which have been coded through ordinary convolutional encoders. As a result, immunity to stated phase ambiguities is provided by the differential encoded data. This is described in detail below.

A "satellite" is defined herein to mean a man-made object or vehicle intended to orbit Earth and includes both geostationary and orbiting satellites and/or combinations thereof including low earth orbiting (LEO) satellites. A "constellation" is defined herein to mean an ensemble of satellites arranged in orbits for providing specified coverage (e.g., radio communication, photogrammetry, etc.) of portion(s) or all of the celestial body. A constellation typically includes multiple rings (or planes) of satellites and may have equal numbers of satellites in each plane, although this is not essential. As used herein the terms "cell" and "antenna pattern" are not intended to be limited to any particular mode of generation and include those created by either terrestrial or satellite cellular communications systems and/or combinations thereof.

Figure 1:
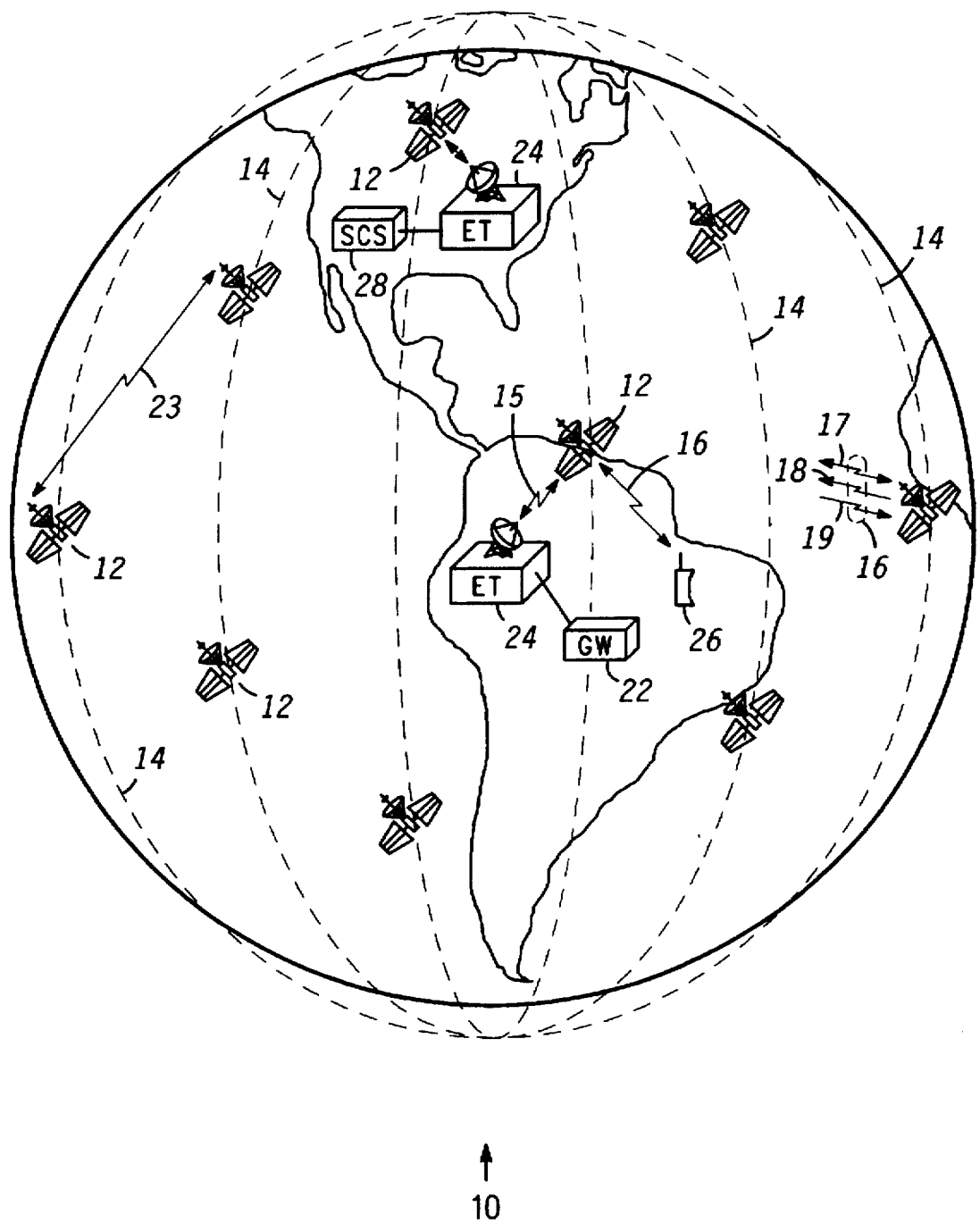
FIG. 1 illustrates a highly simplified diagram of a satellite-based communication system with which the present invention may be practiced.

FIG. 1 illustrates a highly simplified diagram of a satellite-based communication system with which the present invention may be practiced. Communication system 10 uses six polar orbits 14, with each orbit 14 holding eleven satellite communication stations 12 for a total of sixty-six satellite communication stations 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few of satellites 12.

For example, each orbit 14 encircles Earth at an altitude of around 780 km, although higher or lower orbital altitudes may be usefully employed. Due to the relatively low orbits of exemplary satellites 12, substantially line-of-sight electromagnetic (e.g., radio, light etc.) transmission from any one satellite or reception of signals by any one satellite involves or covers a relatively small area of Earth at any instant.

For the example shown, satellites 12 travel with respect to Earth at around 25,000 km/hr, allowing satellite 12 to be visible to a terrestrial station for a maximum period of circa nine minutes. The present invention is applicable to systems including satellites having low-Earth, medium-Earth and geo-synchronous orbits. Additionally, it is applicable to orbits having any angle of inclination (e.g., polar, equatorial or other orbital pattern).

Satellites 12 communicate with terrestrial stations which may include some number of radio communication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the Earth or in the atmosphere above the Earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

System 10 may accommodate any number, potentially in the millions, of subscriber units 26. In the preferred embodiments of the present invention, subscriber units 26 communicate with nearby satellites 12 via subscriber links 16. Subscriber links 16 encompass a limited portion of the electromagnetic spectrum that is divided into numerous channels. Subscriber links 16 are preferably combinations of L-Band frequency channels and may encompass Frequency Division Multiplex Access (FDMA) and/or Time Division Multiple Access (TDMA) communications (infra) or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12.

On the other hand, traffic channels 17 are two-way channels that are assigned to particular subscriber units 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, as a minimum, a two-way voice conversation. To support real-time communications, a time division multiple access (TDMA) scheme is desirably used to divide time into frames, preferably in the 60–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a like number of independent calls.

Satellites 12 communicate with other nearby satellites 12 through cross links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using subscriber links 16. Alternatively, a communication may be routed down to or up from any of many ETs 24, of which FIG. 1 shows only two, through earth links 15. ETs 24 are preferably distributed over the surface of the earth in accordance with geo-political boundaries. In the preferred embodiments, each satellite 12 may communicate with up to four ETs 24 and over a thousand subscriber units 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

With the example constellation of sixty-six satellites 12, at least one of satellites 12 is within view of each point on Earth's surface at all times (i.e., full coverage of the Earth's surface is obtained). Theoretically, any satellite may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

Figure 2:
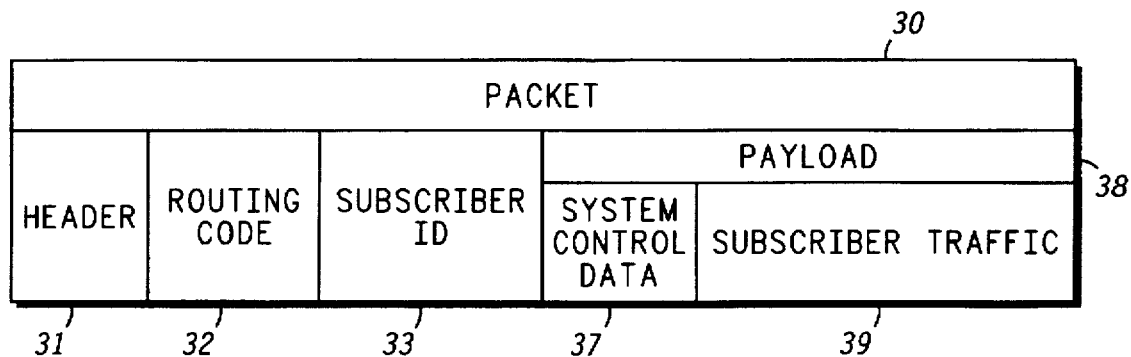
FIG. 2 illustrates an example of an exemplary data packet used to transport communications suitable for use in a preferred embodiment of the present invention.

FIG. 2 illustrates an example of an exemplary data packet used to transport communications suitable for use in a preferred embodiment of the present invention. Data packet 30 that may be used to transport a communication to subscriber unit 26 (FIG. 1). As discussed above, communications in the preferred embodiments are configured in a digital format. Packet 30 includes header 31 which carries data identifying a type characterization to be associated with packet 30, a length to be associated with packet 30, and any other information conventionally included in data packet headers. The type characterization may indicate whether packet 30 exclusively conveys system control messages or whether it conveys subscriber traffic. Routing code 34 is included to instruct system 10 (FIG. 1) where to deliver packet 30.

Subscriber ID 33 represents a code that uniquely identifies subscriber unit 26 and that is known to the identified subscriber unit and to any satellite 12 (FIG. 1) providing traffic channel 17 (FIG. 1) to subscriber unit 26. Subscriber unit 26 monitors subscriber IDs 33 transmitted over broadcast channel 18 (FIG. 1) to determine if packets 30 are intended for it. Satellite 12 uses subscriber IDs 33 of packets 30 that carry subscriber unit traffic to route such packets 30 to traffic channels 17 assigned to the identified subscriber unit 26.

Header 31, routing code 32, and subscriber ID 33 represent overhead data which serve to get packet 30 to its destination. At the packet's destination, payload data 38 are consumed. In other words, the purpose of sending packet 30 to a destination is typically to deliver payload data 38, not header 31, routing code 32, or subscriber ID 33. Payload data 38 includes either system control data or system control data together with subscriber traffic 39 (e.g., voice and/or data). System control data are commands or messages which are interpreted and acted upon by subscriber units 26. These commands are typically very short. When system control data are delivered over broadcast channel 18, subscriber traffic 39 is omitted, and the resulting packet is very short so that as many messages as possible may be broadcast over broadcast channel 18. Subscriber traffic 39 represents all subscriber data transported in the course of a call. When packet 30 is delivered over traffic channel 17, a significant amount of subscriber traffic is appended. As discussed above, a digitized version of an entire frame of conversational audio may be conveyed by subscriber traffic 39.

Compared to the size of subscriber traffic 39, the length of system control data 37 is small. Thus, system control data 37 may be delivered to subscriber unit 26 along with subscriber traffic 39 while a call is ongoing. Examples of system control messages which may be delivered with subscriber traffic 39 via a traffic channel 17 include messages which inform subscriber unit 26 that the other party to a call has "hung-up" or that another call is waiting for the subscriber unit 26.

Figure 3:
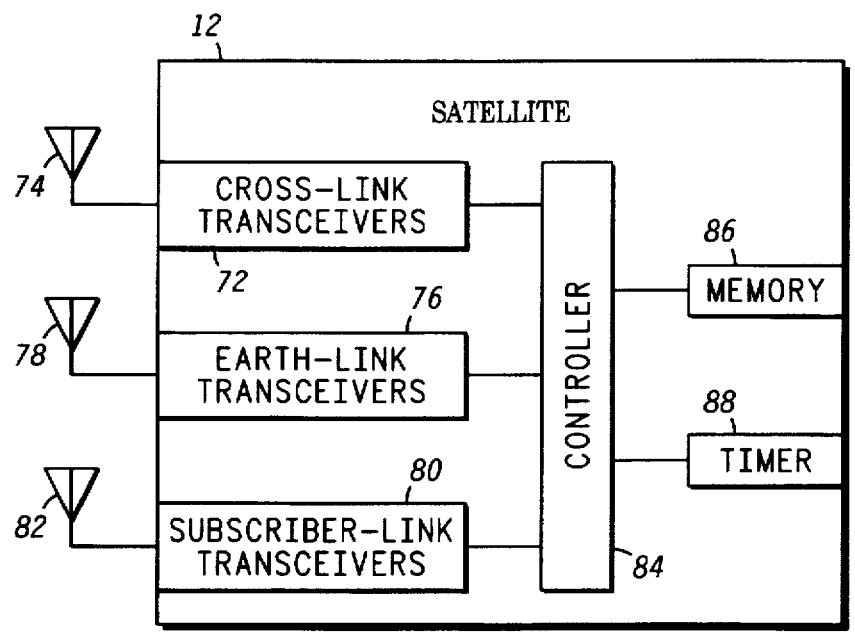
FIG. 3 illustrates a simplified block diagram of a satellite radio communication station suitable for use in a preferred embodiment of the present invention.

FIG. 3 illustrates a simplified block diagram of a satellite radio communication station suitable for use in a preferred embodiment of the present invention. Preferably, all satellites 12 within system 10 (see FIG. 1) include equipment as illustrated by the block diagram of FIG. 4. Satellite 12 includes cross-link transceivers 72 and associated antennas 74. Transceivers 72 and antennas 74 support cross-links to other nearby satellites 12. Earth-link transceivers 76 and associated antennas 78 support earth-links to communicate with earth terminals 24 (FIG. 1). Subscriber-link transceivers 80 and associated antennas 82 support subscriber units 26 (FIG. 1). Preferably, each satellite 12 may simultaneously support a link for up to several thousand or more of subscriber units 26 (FIG. 1). Of course, those skilled in the art will appreciate that antennas 74, 78, and 82 may be implemented either as single multi-directional antennas or as banks of discrete antennas. It is desirable that each subscriber-link antenna 82 be a phased array antenna capable of accessing many cells simultaneously.

A controller 84 couples each of transceivers 72, 76, and 80 as well as to a memory 86 and a timer 88. Controller 84 may be implemented using one or more processors. Controller 84 uses timer 88 to maintain, among other things, the current date and time. Memory 86 stores data that serve as instructions to controller 84 and that, when executed by controller 84, cause satellite 12 to carry out procedures which are discussed below. In addition, memory 86 includes variables, tables, and databases that are manipulated during the operation of satellite 12.

Subscriber-link transceivers 80 are desirably multi-channel FDMA/TDMA transceivers capable of transmitting and receiving on all different selectable frequencies during particular, selectable, time slots as directed by controller 84. Subscriber-link transceivers 80 contain multi-channel radios having sufficient number of channels to provide the desired number of transmission and reception frequencies for signal access and control and for the user voice and/or data. Controller 84 may provide for allocation of the frequency and time-slot assignments, cell-to-cell hand-off and other overhead and management and control functions. Subscriber-link transceivers 80 desirably provide for transmission and reception on any frequency channel set so that each of subscriber-link transceivers 80 may, if needed, utilize the entire spectral capacity of all frequency channel sets by having the capability to handle all frequency and time slot assignments.

Figure 4:
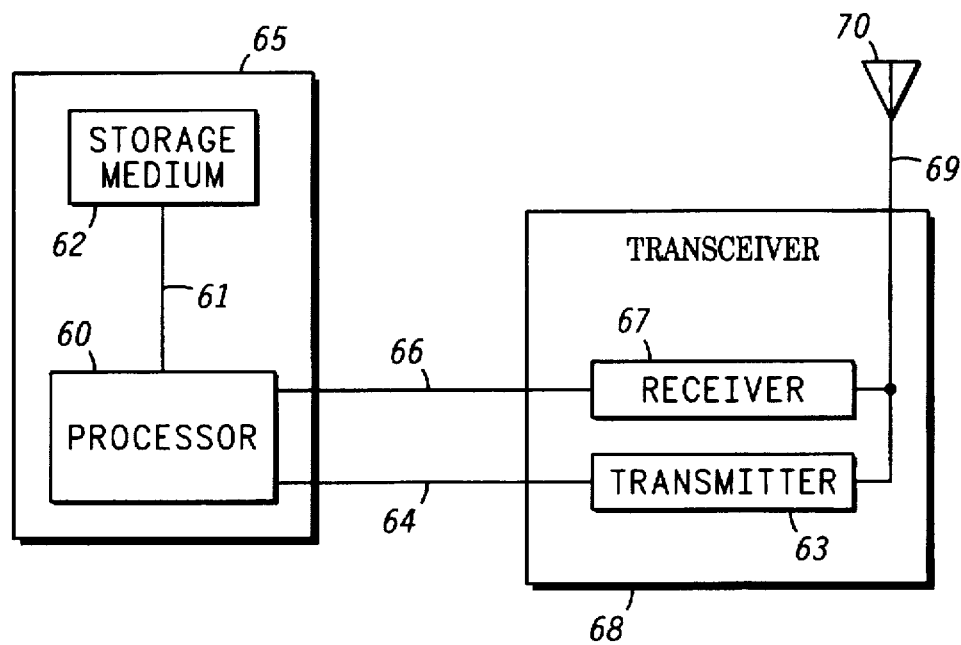
FIG. 4 illustrates a simplified block diagram of a system control station and an earth terminal suitable for use in a preferred embodiment of the present invention.

FIG. 4 illustrates a simplified block diagram of a system control station and an earth terminal suitable for use in a preferred embodiment of the present invention. Control station 65 and terrestrial station 68 are desirable part of SCS 28 (FIG. 1) and ET 24 (FIG. 1) respectively. Control station 65 comprises processor 60 coupled to associated storage medium 62 (e.g., random access memory or RAM, other semiconductor or magnetic read-write memory devices, optical disk, magnetic tape, floppy disk, hard disk etc.) via link 61. Terrestrial station 68 includes antenna 70 coupled to transmitter 63 and receiver 67 via link 69. Transmitter 63 and receiver 67 are coupled to processor 60 via links 64 and 66, respectively. Processor 60 desirably carries out procedures exemplified below and described in the associated text. For example, in addition to performing other tasks as appropriate, processor 60 desirably stores results from such procedures in storage medium 62. Transmitter 63 and/or receiver 67 transmit messages to and/or receive messages from satellites 12.

Processor 60 generally controls and manages user access, message reception and transmission, channel set-up, radio tuning, frequency and time slot assignment, and other cellular radio communication and control functions not managed or provided for by controller 84 (FIG. 3). Among other things, processor 60 and/or controller 84 (FIG. 3) desirably executes procedures to allow user access to communication system 10. This may include procedures for protocols for channel setup and other associated functions as discussed below.

Figure 5:
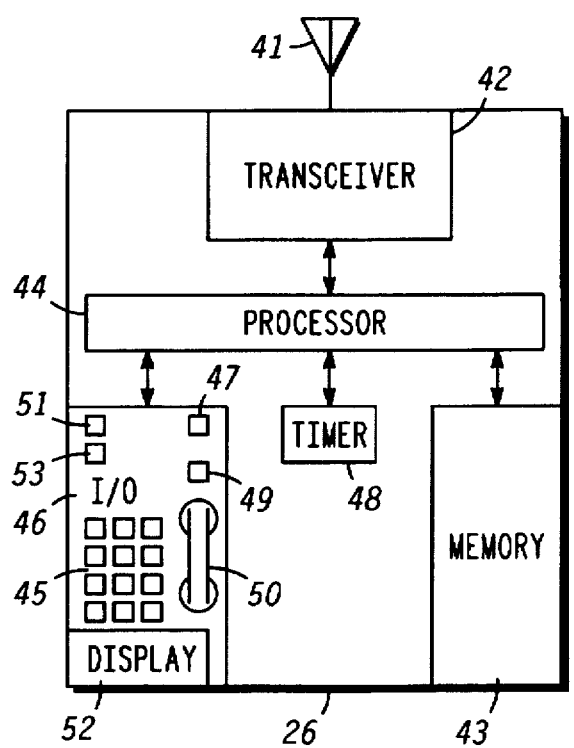
FIG. 5 illustrates a simplified block diagram of a subscriber unit suitable for use in a preferred embodiment of the present invention.

FIG. 5 illustrates a simplified block diagram of a subscriber unit suitable for use in a preferred embodiment of the present invention. Subscriber unit 26 (analogous to subscriber unit 26 of FIG. 1) communicates with communication system 10, and may also communicate through communication system 10 to other SUs 26 or another telecommunication device. Subscriber unit 26 includes transceiver 42 which transmits and receives signals to and from communication system 10 using antenna 41. Transceiver 42 is desirably a multi-channel transceiver capable of transmitting and receiving on all frequency channels in specified time slots as required by communication system 10.

Transceiver 42 desirably comprises an acquisition channel transceiver portion, a broadcast channel receiver portion and a traffic channel transceiver portion. The acquisition channel transceiver portion communicates on one of several acquisition channels as determined by satellite 12 and is primarily used during access protocols when a subscriber desires access to communication system 10 as previously discussed. The traffic channel transceiver portion communicates with communication system 10 on a traffic channel assigned by satellite 12. Those of ordinary skill in the art will understand that the acquisition channel transceiver portion, the broadcast channel receiver portion and the traffic channel transceiver portion may be contained in one unit capable of all three functions.

Transceiver 42 couples to a processor 44, which controls the frequency and timing parameters upon which transceiver 42 operates. In addition, processor 44 preferably controls the power level at which transceiver 42 transmits signals. Additionally, processor 44 desirably couples to input/output (I/O) section 46, timer 48, and memory 43. Processor 44 uses timer 48 to maintain the current date and time. Memory 43 includes semiconductor, magnetic, and other storage devices for storing data which serve as instructions to processor 44 and which, when executed by processor 44, cause subscriber unit 26 to carry out procedures which are discussed below. In addition, memory 43 includes variables, tables, and databases that are manipulated during the operation of subscriber unit 26.

Conventional cellular radio units and systems are described for example in U.S. Pat. Nos. 4,783,779, 4,144, 412, and 5,097,499, and satellite communication systems are described for example in U.S. Pat. Nos. 4,722,083 and 4,819,227. These patents are herewith incorporated by reference. Subscriber-link antennas 82 (FIG. 3), subscriber-link transceivers 80 (FIG. 3), control station 28 (FIG. 1) and earth terminal 24 (FIG. 1) perform those functions and contain at least those equipments conventionally associated with switched terrestrial or satellite cellular communication systems, plus additional functions and equipment explained in more detail below.

Figure 6:
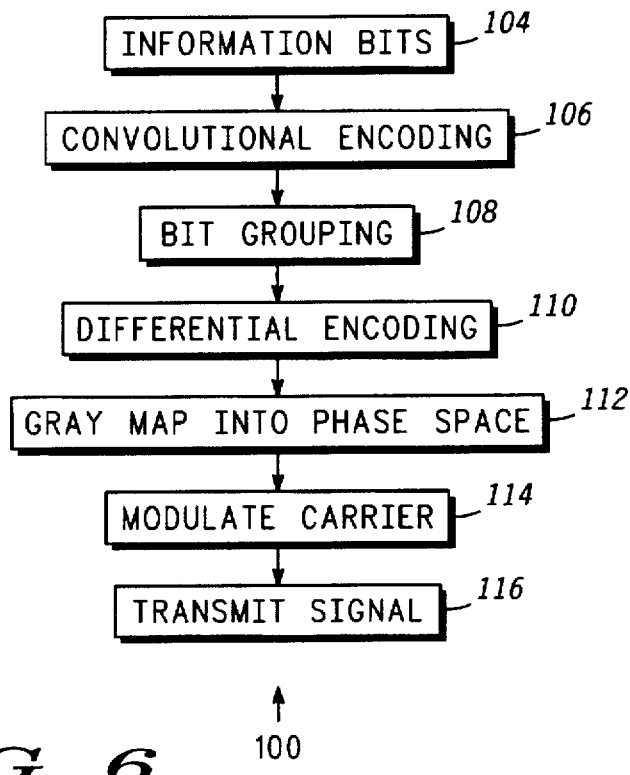
FIG. 6 shows a flowchart of a sequence of some of the operations performed by a transmitter suitable for use in a preferred embodiment of the present invention.
Figure 7:
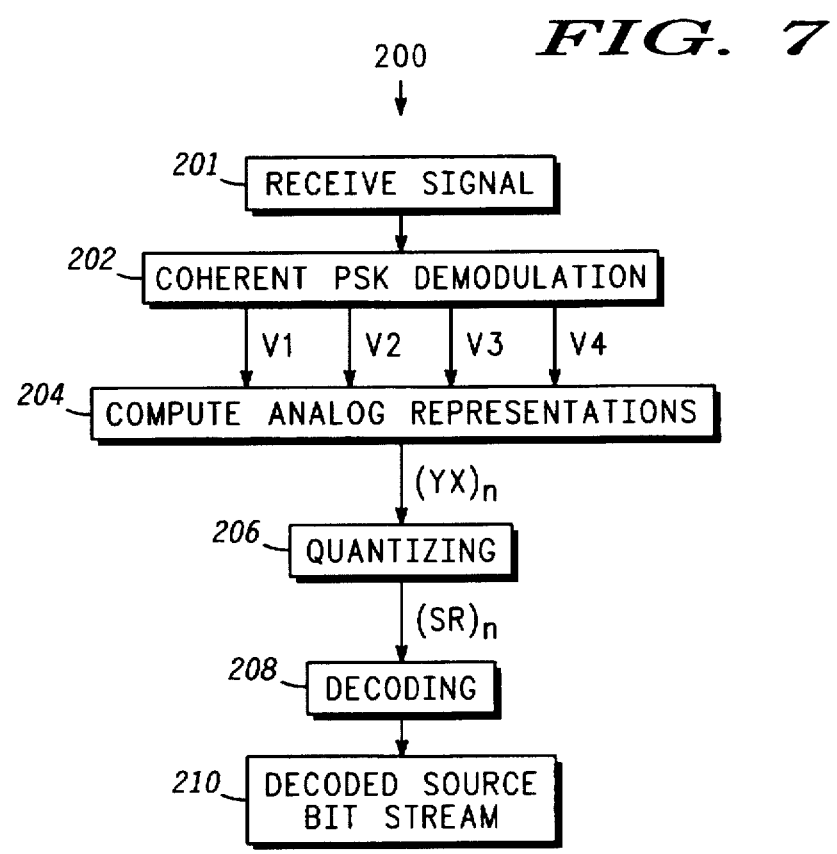
FIG. 7 shows a flowchart of a sequence of some of the operations performed by a receiver suitable for use in a preferred embodiment of the present invention.

FIG. 6 shows a flowchart of a sequence of some of the operations performed by a transmitter suitable for use in a preferred embodiment of the present invention. FIG. 7 shows a flowchart of a sequence of some of the operations performed by a receiver suitable for use in a preferred embodiment of the present invention. The operations shown in FIG. 6 and FIG. 7 are preferably performed by receiver and transmitter portions of transceiver 42 (FIG. 5) of a subscriber unit, and transceiver 80 (FIG. 3) of a satellite. Additionally, transceivers 72, 76 (FIG. 3) of a satellite as well as receiver 67 and transmitter 63 (FIG. 4) of terrestrial station 68 (FIG. 4) may also perform the sequence of operations shown in FIG. 6 and FIG. 7.

Referring now to procedure 100 of FIG. 6, a stream of information bits 104 is convolutionally encoded in task 106. The stream of information bits may represent voice or other data converted to a digital form. The encoder in task 106 convolutionally encodes the information bit stream. Convolution encoding is a technique well known in the art. The particular algorithm used by task 106 is not important to the present invention. Convolution encoding is described by John Proakis, "Digital Communications", Section 5.3, McGraw-Hill Publications, 1983.

Task 108 groups sequential bits into pairs of bits. In task 110, each of the pairs of bits is differentially encoded based on the previous pair. This is explained in more detail below.

Task 112 maps the differentially encoded pairs into specified different phases (i.e., gray space), a technique well known in the art. In the preferred embodiment, the differentially encoded pairs are mapped into one of four specified different phases. The mapping of the two-bit symbols into each of four different phases (i.e., spaced equi-angularly around the circle) is preferably done in accordance with Gray Coding to reduce the number of bit errors to only one when adjacent phase errors occur. A phase error on a channel causes a transmitted phase to be received as a neighboring adjacent phase.

Task 114 phase modulates a carrier frequency according to the phase of task 112. The phase modulated carrier frequency is then transmitted in task 116. In the preferred embodiment, this signal may be transmitted from a subscriber unit 26 (FIG. 5) to one of the satellite communication stations 12 (FIG. 3). Also, in the preferred embodiment, the signal may be transmitted from the satellite communication station to a subscriber unit.

The following is a brief description of the differential encoding performed in task 110:

$(BA)_n$ represents an uncoded 2-bit symbol sequence input to task 110 where n=1,2, . . . , and $(PQ)_n$ represents the differentially encoded version of the symbol sequence. The following relations are used to obtain the differentially encoded symbols:

$$P_n = (A_n.\text{XOR}.B_n)(A_n.\text{XOR}.P_{n-1}) + (A_n.\text{XOR}.B_n)(B_n.\text{XOR}.Q_{n-1}) \quad (1a)$$

$$Q_n = (A_n.\text{XOR}.B_n)(B_n.\text{XOR}.Q_{n-1}) + (A_n.\text{XOR}.B_n)(A_n.\text{XOR}.P_{n-1}) \quad (1b)$$

The decoding process is then given by:

$$A_n = (P_n.\text{XOR}.Q_n)(P_n.\text{XOR}.P_{n-1}) + (P_n.\text{XOR}.Q_n)(Q_n.\text{XOR}.Q_{n-1}) \quad (2a)$$

$$B_n = (P_n.\text{XOR}.Q_n)(Q_n.\text{XOR}.Q_{n-1}) + (P_n.\text{XOR}.Q_n)(P_n.\text{XOR}.P_{n-1}) \quad (2b)$$

These equations are used for hard-decision decoding. (See Kamilo Feher, "Digital Communications, Satellite/Earth Stations Engineering", Prentice Hall, 1983).

The encoding/decoding procedure defined by equations (1) and (2) provides immunity to phase ambiguities or cycle lips of +/−180, as well as +/−90 degrees in the detection of the carrier phase in the receiver. Cycle slips can occur as a result of fading on a radio channel.

By referring now to procedure 200 of FIG. 7, the signal transmitted in task 116 of procedure 100 (FIG. 6) is received in task 201. In a preferred embodiment this signal may be received at a subscriber unit 26 (FIG. 5) from one of the satellite communication stations 12 (FIG. 3). Also, in the preferred embodiment, the signal may be received at a satellite communication station from a subscriber unit.

Task 202 demodulates the received signal preferably using a conventional coherent phase shift-keyed (PSK) demodulator. Task 202 preferably computes four decision variables (V1, V2, V3 and V4) corresponding to each of the four possible transmitted phases in a QPSK modulation system. Task 204 uses the four decision variables to compute analog bit representations $(yx)_n$. Task 206 performs a scaling operation resulting in scaled quantized values $(sr)_n$.

Task 208 performs a decoding process on the scaled quantized values $(sr)_n$ which results in a decoded bit stream 210 corresponding to the source bit stream (i.e., information bits 104 (FIG. 6)). The decoded bit stream information can then be used by a user.

Tasks 202 through 208 are described in more detail below. In task 202, the received signal is demodulated in conventional coherent phase shift-keyed (PSK) demodulator to compute the four decision variables, U1, U2, U3 and U4. The decision variables correspond to each of the four possible transmitted phases in a QPSK (that is 4-ary PSK) modulation system. The phase vectors V1, V2, V3, V4 are the four different phases used to encode the four possible different 4-ary data bit symbols made each of 2 bits.

The phase vectors are computed as follows:

$$Vm = \exp j[2\pi(m-1)/4+\partial] \quad (3)$$

where m=1,2,3 or 4 in which $\partial$ is generally some initial phase offset, which can be set to zero depending on how the phases are positioned around the phase circle (the signal space constellation). A non-zero value for $\partial$ may be used to facilitate, in certain cases, symbol synchronization in the receiver. It is important to map the 2-bit symbols into the phases in accordance with Gray coding.

If hard-decision Viterbi decoding were to be used, the demodulator determines the phase corresponding to the largest decision variable from among the four computed outputs of task 202. The corresponding symbol is differentially decoded using equations (2) before performing the Viterbi decoding operation.

However, for soft-Viterbi decision decoding, preliminary processing is needed to transform the phase information detected into some analog representation for the bits encoded by the phase. For DEQPSK, the demodulation process should result into 2 bits which we denote by "ba". With Gray encoding of bit combinations into the phases, the following is a correspondence between the possible transmitted di-bits and the computed decision variables.

| ba | $U_m$ | (4) |
|----|-------|-----|
| 00 | U1 | |
| 01 | U2 | |
| 11 | U3 | |
| 10 | U4 | |

The analog values yx corresponding to each of the two bits encoded by the detected phase may be represented reasonably as either by:

$$x = U2 + U3 - U1 - U4 \quad (5a)$$

$$y = U3 + U4 - U1 - U2 \quad (5b)$$

or alternatively by:

$$x = \text{Max}\{U2, U3\} - \text{Max}\{U1, U4\} \quad (6a)$$

$$y = \text{Max}\{U3, U4\} - \text{Max}\{U1, U2\} \quad (6b)$$

The analog bit representations proposed by equation (4), or (5), or any other reasonable relations, are scaled to fall over a specified integer range (i.e., 0 to 7) assuming eight level quantization, where the "0" value would represent the ideal value for a "0" bit, and the value "7" would represent the ideal value for a "1" bit, in the absence of noise. This means that the quantities Ui's are computed with eight level quantization resulting in values ranging from 0 to 7. The eight level quantization (which is realized by 3 bits) has been shown by computer simulation of specific codes in Viterbi decoding to achieve a performance of within 0.25 dB from the unquantized output (infinite quantization) of the demodulator, and therefore should be sufficient. (See John Proakis, "Digital Communications", McGraw-Hill Publications, 1983)

The scaling process of task 206 on the quantities x and y is mathematically represented by the following relation:

$$r,s = [(7+x,y)/2] \quad (7)$$

in which r and s represent the scaled quantized values for each bit, and the notation "[ ]" is meant to round off the result of the addition to the larger nearest integer, and replace any result exceeding 7 by 7, and replace any result less than 0 by 0.

The decoding process of task 208 should conceptually end up with two effects. These are 1) undoing the differential encoding, and 2) undoing the convolutional encoding, used at the transmitter in order to finally recover the original bit stream emitted from the transmitting source. However, the optimum procedure discussed below does not differentially decode the detected bit quantities (given by equation (7)), first. Instead, it is based on the strategy of comparing the differentially-encoded detected bit quantities with the differentially-encoded version of all possible symbol (and hence bit) sequences transmitted. In doing so, the procedure exploits the structure and the constraints imposed by the convolutional encoder on the transmitted bit sequences in order to reduce the amount of computation involved in the comparison process. The detected bit quantities are compared, given by equation (7), with the differential encoded version of the possible transmitted bit sequences. The detected bit quantities include the effect of the differentially encoding done at the transmitter. The comparison is limited to only the feasible alternative bit sequences on the trellis as defined by the convolutional encoder used at the transmitting end.

Mathematically, the procedure of task 208 prescribes as follows:

$(BA)_n^{(r)}$ represents the sequence of the convolutionally encoded 2-bit symbols (in QPSK) transmitted on the rth path in the trellis, for n=1,2,3, . . . and n denotes the symbol transmitted at the nth time step (the nth symbol on the path). $(QP)_n^{(r)}$ represents the differential encoded version of the sequence $(BA)_n^{(r)}$, as defined by equations (1), transmitted on the rth path in the trellis. This conversion of the transmitted symbols on the trellis into their differential encoded versions is desirably done with respect to the symbol sequences transmitted on each path, and hence is path dependent. As a result, the same symbol may end up with a different symbol when differentially encoded depending on what encoded symbol it followed on that path. This requires the storage of the differential encoded version of the symbol sequence on each path in the trellis. The process may assume that the differential encoding of the first symbol (at start of transmission) output from the convolutional encoder is done with respect to a known symbol, say eleven. This kind of synchronization is also be achieved periodically by transmitting a unique word (known to the receiver) which bypasses the convolutional encoder but is differential encoded.

With the above definitions, the procedure of task 208 implements a Viterbi decoding procedure on the detected bit quantities given by equation (7), but with the following metric, $M_n^{(r)}$, defined for each symbol n on a path r in the trellis, $$M_n^{(r)} = |7*Q_n^{(r)} - s_n| + |7*P_n^{(r)} - r_n| \quad (8)$$

The squared power may be used instead of the absolute value operation as indicated. The factor 7 is used to scale up the noiseless binary values $Q_n^{(r)}$ and $P_n^{(r)}$ to the eight level quantization assumed by the detected quantities r and s.

The cumulative metric due to a sequence of symbols, N, for a path r, is then given by $$M^r = \Sigma\, M_n^r \text{ from } n=1 \text{ to } N \quad (9)$$

The procedure of task 208 traces a sequence of received symbols, $sn_m$, through the trellis on alternate paths, while computing the symbol's contribution to each path metric on the basis of its distance (as defined by equation 8) with the differential encoded version of the corresponding noiseless transmitted symbol on that path in the trellis. The source bit stream (input to the convolutional encoder) associated with the path with the smallest metric, as given by equations (8) and (9), provides optimally decoded (in the maximum likelihood sense assuming white gaussian noise) information.

FIG. 8 illustrates a flowchart of procedure 300 for decoding a received signal suitable for use in a preferred embodiment of the present invention. In the preferred embodiment, the differentially decoding process of procedure 300 is performed by task 208 (FIG. 7).

Procedure 300 desirably uses an integrated differential and Viterbi decoder. Those of skill in the art will understand that a Viterbi decoder is generally used to decode convolutionally encoded data, including convolutionally encoded QPSK data. However, when convolutionally encoded data is subsequently differentially encoded prior to a phase modulated transmission, the decoding process cannot simply be reversed to arrive at the original data. This problem is solved by integrating the Viterbi decoding process with a differentially decoding process of procedure 300. Procedure 300 is performed on decoded data that has been first convolutionally encoded and then differentially encoded, for example by procedure 100 (FIG. 6).

In task 301, detected bit quantities $(sr)_n$ are received. The detected bit quantities are scaled analog representations of the transmitted bit stream. As discussed above, in a preferred embodiment, the analog representations are scaled between zero and seven by a quantizer in task 206 (FIG. 7), however those of skill will understand that other values may be used.

Task 302 preferably utilizes a Viterbi decoding process which determines a path through a trellis arriving at a node of the trellis. The trellis is defined by the particular convolution encoder used in encoding the bits before transmitting. In this example, the algorithm used by convolution encoder in task 106 (FIG. 6) to encode the original bits is used. Those of ordinary skill in the art will understand that a path through the trellis is defined by a sequence of branches, each branch having received bits associated therewith. Thus the resulting path defines a sequence of received bits.

Task 304 replaces the sequence of received bits associated with the path chosen in task 302 with a differentially encoded version of the sequence of received bits. This results in a sequence of received differentially encoded bits. The differential encoding algorithm, for this example, would desirably be the same differential encoding algorithm as that used in the differential encoding process of task 110 (FIG. 6).

Task 306 converts each bit of the sequence of received differentially encoded bits created by task 304 to scaled analog representations of each bit. For example, each bit may be scaled or multiplied by seven. The particular value for scaling is not important for the present invention, however it is preferable to use the same scaling performed by the quantizing task 206 (FIG. 7).

Task 308 computes a metric for the path under consideration. Preferably, the Euclidean distance between the scaled-bit sequence created in task 306 (i.e., scaled sequence of received differentially encoded bits) with the detected bit quantities of task 301 (i.e., sn, rn) is computed. The Euclidean distance defines the metric for the path under consideration. Those of ordinary skill in the art will understand that the Euclidean distance is computed in N-dimensions, where N is the number of bits in the bit sequences.

Task 310 determines alternative paths through the trellis and repeats tasks 302 through 308 for each of the alternative paths associated with each node. Task 310 repeats tasks 302 through 308 for each alternative path until all alternative paths are considered. When task 310 is complete, a metric for each alternative path will have been created by each repetition of task 308.

Task 312 compares each metric associated with the alternative paths and selects the path having the best metric. Since, in the preferred embodiment, each metric is based on Euclidean distances, a lower metric indicates a more preferred path. The path chosen is herein referred to as a surviving path associated with the node under consideration.

Task 314 repeats tasks 302 through 312 for subsequent nodes associated with the stage of the trellis under consideration. Those of ordinary skill in the art will understand that the number of nodes of the trellis associated with a particular stage is determined by the convolution code. The structure of the trellis, including the number of nodes per stage, is defined by the convolution code used in convolution encoder of the transmitter in task 106. Each repetition of task 312 results in the selection of one surviving path ending at each node of the stage under consideration.

Task 316 repeats tasks 302 through 314 for subsequent stages in the trellis. As with Viterbi decoding, when task 302 is repeated, the paths are chosen to the next stages using the surviving paths as an initial condition. Thus, each repetition extends each of the surviving paths to subsequent stages.

The number of subsequent stages to which the surviving paths from previous stages are extended is dependent on tradeoffs made between the desired accuracy, delays and memory constraints. A decoding delay of five-times the constraint length of the convolutional encoder results in reasonable performance for Viterbi decoding operations. (See John Proakis, "Digital Communications", McGraw-Hill Publications, 1983). As those of ordinary skill in the art will understand, the particular number of subsequent stages is not important for the present invention.

Task 317 calculates the Euclidean distance between each of the surviving paths and the detected bit quantities. The surviving path having the best metric is chosen. When Task 317 has been completed, a final path through the trellis has been determined for the set of detected bit quantities considered up to this point in procedure 300. The final path extends up at a final stage of the trellis as determined by the constraints discussed above. The resulting path represents a decoded sequence of bits (i.e., the decoded bit stream). Task 318 decodes the sequence of received bits. This decoded bit stream is desirably identical to the original bit stream before being convolution encoded in convolution encoding process of task 106 (FIG. 6) of the transmitter. The resulting decoded bit stream may be used as desired in the receiver. For example, it may be converted back to voice data.

Procedure 300 is repeated to decode the next sequence of detected bit quantities. Each time procedure 300 is repeated, the alternative paths through the trellis are extended from the previous surviving path.

The coupled soft-decision Viterbi and differential decoding procedure described above poses no problem when the number of bits output at a time, n, from the convolutional encoder is even. Because that would mean that each path in the trellis will consist of an integer number of the 2 bit QPSK symbols, which can be differentially encoded, by equations (1), in order to compute the path metric as expressed by equation (8). However, when the number of bits output at a time by the convolutional encoder is odd (say in a rate 1/3 with k=1,n=3 encoder), the bit sequence transmitted on a path made up of an odd number of branches in the trellis will consist of an integer number of the 2 bit QPSK symbols, which can be differentially encoded, plus a left over bit which can not be properly differentially encoded unless the next bit in the sequence is known (as indicated by equations (1)). This next bit in the sequence would generally depend on how the path is continued to the next stage in the trellis. It is desirable to compute the contribution of the left-over bit to the path metric in order to determine the surviving path (the one with the smallest metric) from a number of alternate paths terminating into the same stage at a node in the trellis. Two methods are described below for to deal with an odd number of bits.

In the first method, the decision over the surviving paths is deferred until the paths are extended to the next stage in the trellis to make up an even number of branches, and hence provide an integer number of symbols for the complete computation of the paths metrics. This method is not efficient from the implementation standpoint because, it requires the storage of twice the number of surviving paths plus twice the number of path metric comparisons for determination of the surviving paths as normally required by a Viterbi decoder, though only every other node when the paths terminating into the various states at the node include an odd number of branches.

In the second method, the contribution of the left over bit to the path metric is computed based on a look-ahead lowest contributing branch to the next stage in the following manner:

Let $L_n^{(r)}$ represent the left over binary bit from path r terminating into a stage at node n in the trellis.

Let $F_n^j$ represent the following (next) binary bit transmitted (the matching bit) on branch j from the above stage at node n, for j=1,2,..m, where m is the number of branches emanating from each stage at a node in the trellis.

Let $(QP)_n^{(r)}$ represent the differential encoded version of the last two-bit symbol transmitted on the path r which is under consideration (just prior to the left over bit).

Let $(HG)_n^j$ represent the differential encoded version of the border symbol, $F_n^j L_n^{(r)}$.

Let $(sr)_n$ represent the bit quantities for the symbol corresponding to the $(HG)_n^j$ symbol, as computed from equation (7). This is the symbol received at that time step.

Let $B_n^{(r)}$ represent the minimum contribution from the border symbol, $F_n^j L_n^{(r)}$, to the metric for the path r being considered.

The procedure proscribes the following:

$$B^r_n = \text{minimum } [|(7H^j_n - s_n)| + |(7G^j_n - r_n)|] \quad (10)$$

over j=1,2,3, . . . m

The binary G and H bits are computed using the binary differential encoding equations as follows:

$$G^j_n = (L^{(r)}_n \text{ .XOR. } F^j_n)(L^{(r)}_n \text{ .XOR. } P^{(r)}_n) + (L^{(r)}_n \text{ .XOR. } F^j_n)(F^j_n \text{ .XOR. } Q^{(r)}_n) \quad (11a)$$

$$H^j_n = (L^{(r)}_n \text{ .XOR. } F^j_n)(F^j_n \text{ .XOR. } Q^{(r)}_n) + (L^{(r)}_n \text{ .XOR. } F^j_n)(L^{(r)}_n \text{ .XOR. } P^{(r)}_n) \quad (11b)$$

This "look-ahead" technique for finding the minimum contribution of a left over bit allows the computation of the metric for the paths terminating into a node at any stage for determination of the surviving path to that stage and node. This method of handling the left over bits eliminates the requirement for extra path storage as was required by the first method. However, once the surviving path to a final stage is determined in this fashion, then the contribution of the "start over" bit, $F^j_n$, to the metric of the branches continuing from that stage and node is computed decisively because, the previous matching bit $L^{(r)}_n$, is known at this point from the surviving path in the previous stage.

The optimality of the basic decoding procedure given above can be shown as follows: let Un represent the sequence of 2-bit symbols as input to the differential encoder at the transmitter, and let $C_n$ denote the corresponding differential encoded 2-bit symbol sequence. Then, $C_n$ will be a function of $U_n$, and $C_{n-1}$, in accordance with the binary relation given by equations (1).

That is:

$$C_n = f(C_{n-1}, U_n), n=1,2,3, \quad (12)$$

$C_0$ may be set to an arbitrary known (to the receiver) symbol, say eleven. Equation (12) is iterative in n, which allows for solving for $C_{n-1}$ as a function of $C_{n-2}$ and $U_{n-1}$, and repeating the process until all the C's are expressed in terms of the uncoded symbols, the U's, and the initial symbol '11' (with respect to which the differential encoding of the first symbol was performed). This results in the following functional notation, $$C_n = g(U_n, U_{n-1}, U_{n-2}, \ldots, U_1), n=1,2,3,\ldots,n \quad (13)$$

That the nth coded symbol transmitted is a function of the corresponding uncoded nth symbol and all the previous uncoded symbols input to the differential encoder.

The differentially uncoded symbol sequence, the U's, transmitted up to time step n, are confined to the sequences as determined by the alternate paths in the trellis due to prior convolutional coding (the U's are convolutionally coded). Therefore, by moving along each path in the trellis and differentially encoding the symbol sequence $U_n$, we create all possible transmitted differentially encoded symbol sequences, $C_n$'s. The corresponding received symbol sequence (outcome of equation (7)) is donated by $Y_n$.

The maximum likelihood posterior probability is:

$$P(Y_n, Y_{n-1}, \ldots Y_1 \mid C_n, C_{n-1}, \ldots C_1,) \quad (14)$$

This is given by the Viterbi decoding of the received sequence, $Y_n$, using the Euclidean distance metric between the possible transmitted $C_n$ sequences (along the alternative paths in the trellis) and the received sequence $Y_n$. The noise is assumed to be independent from symbol to symbol (satisfied by white Gaussian type noise). The shortest path (smallest distance metric) then gives the associated source bit stream, $B_n$.

While the invention has been described in terms of specific examples and with specific preferred embodiment, it is evident that many alternatives and variations will be apparent to those skilled in the art based on the description herein, and is intended to include such variations and alternatives in the claims.

As described herein, the advantages of the present invention will be apparent to those of skill in the art and provide an improved methods of operating various parts of a communication system. These advantages include improved immunity to phase ambiguities caused by cycle slips in the transmission and reception of convolutionally and differentially encoded data. The advantages also include improved error performance on fading channels in burst mode transmission.

What is claimed is:

1. A method of decoding data that has been first convolutionally encoded by a convolutional encoding algorithm and secondly differentially encoded by a differential encoding algorithm, said method comprising the steps of:
   determining alternative paths through a trellis based on a received sequence of bits, said trellis defined by said convolutional encoding algorithm, each alternative path representing a first sequence of bits;
   differentially encoding each of the first sequences of bits using said differential encoding algorithm to produce corresponding second sequences of bits;
   computing a metric for each alternative path based on said corresponding second sequence of bits, and selecting one path of the alternative paths having the best metric, the one path representing a decoded version of said received sequence of bits.

2. A method as claimed in claim 1 wherein said received sequence of bits represents data that has been first convolutionally encoded by said convolutional encoding algorithm, and secondly differentially encoded by said differential encoding algorithm, and wherein the differential encoding step further comprises the steps of:
   replacing on said trellis, said first sequence of bits with said second sequence of bits,
   and wherein the method further comprises the step of
   receiving said received sequence of bits from a demodulator.

3. A method of decoding data that has been first convolutionally encoded by a convolutional encoding algorithm and secondly differentially encoded by a differential encoding algorithm, said method comprising the steps of:
   determining a path through a trellis based on a received sequence of bits, said trellis defined by said convolutional encoding algorithm, said path defining a first sequence of bits;
   differentially encoding using said differential encoding algorithm, said first sequence of bits to produce a second sequence of bits; and
   computing a metric for said path based on said second sequence of bits, said second sequence representing a decoded version of said received sequence of bits,
   wherein said received sequence of bits represents data that has been first convolutionally encoded by said convolutional encoding algorithm, and secondly differentially encoded by said differential encoding algorithm, and wherein the differentially encoding step further comprises the steps of:
   replacing on said trellis, said first sequence of bits with said second sequence of bits,
   and wherein the method further comprises the step of:
   receiving said received sequence of bits from a demodulator;
   repeating the determining and differentially encoding steps for alternative paths through said trellis, and
   wherein the computing step further comprises the step of computing a metric for each of said alternative paths,
   and wherein the method further comprises the step of:
   selecting a surviving of said alternative paths based on said metric for each of said alternative paths, said one of said alternative paths representing said decoded version of said received sequence of bits corresponding to said data that has been first convolutionally encoded and secondly differentially encoded, and
   wherein said received sequence of bits comprises an odd number of bits, and wherein said method further comprises the step of delaying the step of selecting said surviving path until a next stage of said trellis.

4. A method as claimed in claim 3 further comprising the step of looking ahead to said next stage based on a least contributing branch of said trellis.

5. A method as claimed in claim 2 wherein said surviving of said alternative paths represents one of a plurality of surviving paths to a stage of said trellis, and wherein the selecting step includes the step of selecting other surviving paths for other nodes associated with said stage of said trellis, and wherein said method further comprises the steps of:
   repeating the determining, differentially encoding and computing steps for subsequent stages of said trellis; and
   selecting a final path by comparing said metric associated with said surviving paths, said final path representing said decoded version of said received sequence of bits.

6. A method as claimed in claim 5 further comprising the steps of:

convolutionally encoding phase shift keyed (PSK) data to provide a convolutionally encoded sequence of bits;

grouping pairs of sequential bits of said convolutionally encoded sequence of bits to produce grouped pairs;

differentially encoding said grouped pairs with said differential encoding algorithm to produce differentially encoded pairs of bits;

mapping each of said differentially encoded pairs into phase space to arrive at a phase angle associated with each of said differentially encoded pairs; and transmitting an encoded version of said PSK data by modulating a carrier signal with said phase angle.

7. A method as claimed in claim 5 wherein said data is quadrature phase shift-keyed (QPSK) data, and wherein said trellis is defined by said convolutional encoding algorithm used to convolutionally encode said QPSK data.

8. A method as claimed in claim 7 further comprising the step of receiving said received sequence of bits from a coherent phase QPSK demodulator.

9. A method as claimed in claim 7 wherein said QPSK data is first convolutionally encoded by said convolutional encoding algorithm, and wherein said convolutionally encoded QPSK data is subsequently differentially encoded by said differential encoding algorithm.

10. A method of decoding phase shift-keyed (PSK) data that is first convolutionally encoded by a convolutional encoding algorithm, and secondly differentially encoded by a differential encoding algorithm, said method comprising the steps of:

a) providing a detected bit stream representing an encoded version of said PSK data;

b) determining alternative paths on a trellis, said trellis defined by said convolutional encoding algorithm, each of said alternative paths representing a sequence of bits;

b1) differentially encoding each sequence of bits represented by said alternative paths to define differentially encoded versions of each sequence of bits, the differentially encoding step using said differential encoding algorithm;

c) replacing on said trellis each sequence of bits associated with said alternative paths with said differentially encoded version of said sequence;

d) computing a metric for each of said alternative paths by comparing said detected bit stream with each of said differentially encoded version of said sequence; and e) selecting one path of said alternative paths having the best metric, said one path defining a decoded version of said PSK data.

11. A method as claimed in claim 10 further comprising the steps of:

f) repeating steps (b), (b1), (c), (d) and (e) for all nodes associated with a stage of said trellis to determine a surviving path for each of said nodes;

g) determining said alternative paths to subsequent stages of said trellis using said surviving path as a starting point; and (h) selecting one of said alternative paths based on said metric, said one of said alternative paths representing a decoded sequence of bits corresponding to said decoded version of said PSK data.

12. A method as claimed in claim 10 wherein said PSK data includes quadrature phase shift-keyed (QPSK) data, and wherein the determining step includes the step of determining said alternative paths on said trellis wherein said trellis defined by said convolutional encoding algorithm used to convolutionally encode said QPSK data.

13. A method of decoding phase shift-keyed (PSK) data that is first convolutionally encoded by a convolutional encoding algorithm, and secondly differentially encoded by a differential encoding algorithm, said method comprising the steps of:

a) providing a detected bit stream representing an encoded version of said PSK data;

b) determining alternative paths on a trellis, said trellis defined by said convolutional encoding algorithm, each of said alternative paths representing a sequence of bits;

b1) differentially encoding each sequence of bits to define differentially encoded versions of each sequence of bits, the differentially encoding step using said differential encoding algorithm;

c) replacing on said trellis each sequence of bits associated with said alternative paths with said differentially encoded version of said sequence;

d) computing a metric for each of said alternative paths by comparing said detected bit stream with each of said differentially encoded version of said sequence; and e) selecting one path of said alternative paths having the best metric, said one path defining a decoded version of said PSK data, wherein said sequence of bits comprises an odd number of bits, and wherein said method further comprises the step of delaying a selection of said one path until a subsequent stage of said trellis.

14. A method as claimed in claim 13 further comprising the step of looking ahead to a next stage of said trellis based on a least contributing branch from a node to said next stage.

15. A method of communicating phase shift-keyed (PSK) data comprising the steps of:

(a) convolutionally encoding said PSK data to provide a convolutionally encoded sequence of bits;

(b) grouping pairs of sequential bits of said sequence to produce grouped pairs;

(c) differentially encoding said grouped pairs to produce differentially encoded pairs of bits;

(d) mapping each of said differentially encoded pairs into a phase space to arrive at a phase angle associated with each of said differentially encoded pairs;

(e) transmitting an encoded version of said PSK data by modulating a carrier signal with said phase angle;

(f) receiving said carrier signal at a coherent PSK demodulator;

(g) computing detected bit quantities based on a received phase angle, said detected bit quantities representing said differentially encoded pairs of bits;

(h) determining an path on a trellis defined by a convolutional encoding algorithm used to convolutional encode said PSK data in step (a), said path representing a first sequence of bits;

(i) replacing said first sequence of bits with a differentially encoded version of said sequence, said differentially encoded version created by a differential encoding algorithm used to differentially encode said PSK data in step (c); and (j) computing a metric for said path by comparing said detected bit quantities with said differentially encoded version of said sequence (k) repeating steps (h)-(j) for alternative paths of said trellis to determine said metric of each of said alternative paths; and (l) selecting a surviving path of the alternative paths based on the metric, said surviving path of the alternative paths representing a decoded sequence bits corresponding to said PSK data.

16. A subscriber unit that decodes encoded phase shift-keyed (PSK) data that has been first convolutionally encoded by a convolutional encoding algorithm, and secondly differentially encoded by a differential encoding algorithm comprising:

a receiver, for providing a received sequence of bits representing said encoded PSK data; and a processor coupled to said receiver, wherein said processor comprises:

means for determining a path through a trellis defined by said convolutional encoding algorithm, said path representing a first sequence of bits;

means for differentially encoding said first sequence of bits to produce a second sequence of bits, said second sequence created by said differential encoding algorithm; and means for computing a metric for said path by comparing said received sequence of bits with said second sequence of bits, said second sequence of bits representing a decoded version of said encoded PSK data; means for determining alternative paths of said trellis to arrive at said metric for each of said alternative paths; and means for selecting a surviving path of said alternative paths based on said metric for each of said alternative paths, said surviving of said alternative paths representing a decoded sequence of bits corresponding to said PSK data.

17. A communication system that decodes phase shift-keyed (PSK) data that has been first convolutionally encoded by a convolutionally encoding algorithm and secondly differentially encoded by a differentially encoding algorithm comprising:

a receiver for providing a received sequence of bits; and a processor coupled to said receiver, wherein said receiver includes means for receiving said received sequence of bits, said wherein said processor comprises:

means for determining a path on a trellis defined by said convolutional encoding algorithm based on said received sequence of bits, said path defining a first sequence of bits;

means for differentially encoding said first sequence of bits to produce a second sequence of bits, said means for differentially encoding creating said second sequence with said differential encoding algorithm; and means for computing a metric for said path by comparing said received sequence of bits with said second sequence of bits, said second sequence of bits representing a decoded version of said PSK data.

18. A communication system as claimed in claim 17 wherein said processor further comprises:

means for determining alternative paths of said trellis to arrive at said metric for each of said alternative paths; and means for selecting a surviving path of said alternative paths based on said metric for said one of said alternative paths, said surviving path of said alternative paths representing a decoded sequence of bits corresponding to said PSK data.

* * * * *